Figure 1:
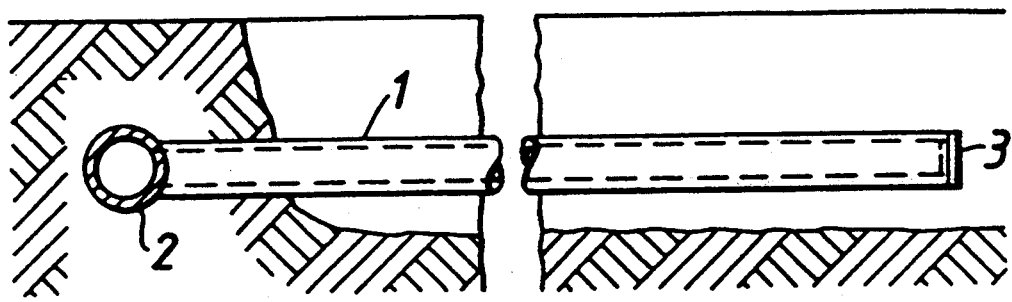

United States Patent [19]

Elgar et al.

[11] Patent Number: 5,433,251

[45] Date of Patent: Jul. 18, 1995

[54] METHOD OF REPLACING BRANCH MAINS

[75] Inventors: Anthony D. Elgar, Mitcham; Brian T. Sales, Dorking; Adrian S. Parkes, Burgess Hill, all of United Kingdom

[73] Assignee: British Gas plc, London, England

[21] Appl. No.: 242,848

[22] Filed: May 16, 1994

Related U.S. Application Data

[62] Division of Ser. No. 786,784, Nov. 1, 1991, abandoned.

[30] Foreign Application Priority Data

Nov. 2, 1990 [GB] United Kingdom ............... 90 23857

[51] Int. Cl.⁶ .................. F16L 55/12; F16L 55/00
[52] U.S. Cl. ........................... 138/98; 138/97; 405/154
[58] Field of Search .............. 138/97, 98; 405/146, 405/150, 154; 264/36, 269; 156/287

[56] References Cited

U.S. PATENT DOCUMENTS

| | | | |
|---|---|---|---|
| 4,170,248 | 10/1979 | Bennett et al. | 138/97 |
| 4,594,025 | 6/1986 | Marlow | 405/146 |
| 4,646,787 | 3/1987 | Rush et al. | 138/98 |
| 4,678,370 | 7/1987 | Allen | 138/97 |
| 4,728,223 | 3/1988 | Rice | 138/97 |
| 4,780,163 | 10/1988 | Haveline et al. | 264/270 |
| 4,954,016 | 9/1990 | Storgard | 405/150 |
| 4,956,032 | 9/1990 | Hahn et al. | 138/97 |
| 5,108,533 | 4/1992 | Long et al. | 156/287 |

Primary Examiner—James E. Bryant, III
Attorney, Agent, or Firm—Oblon, Spivak, McClelland, Maier, & Neustadt

[57] ABSTRACT

A method is provided for replacing a length of a branch gas main 1 joined to a spine main 2 with a length of replacement main 7 having an outer diameter smaller than the inner diameter of the branch main. In the method access is gained to the bore of the branch main and one end of the replacement main 7 is fed along the branch main 1 via the access point and towards the spine main 2 until the branch main 1 has been replaced. During and after the feeding step gas is prevented from entering any clearance 20 between the mains 1 and 7 by means of a head 9 attached to the leading end of the main 7. After the feeding step a sealant 25 is injected into the branch main 1 to form a seal within the clearance 20.

1 Claim, 4 Drawing Sheets

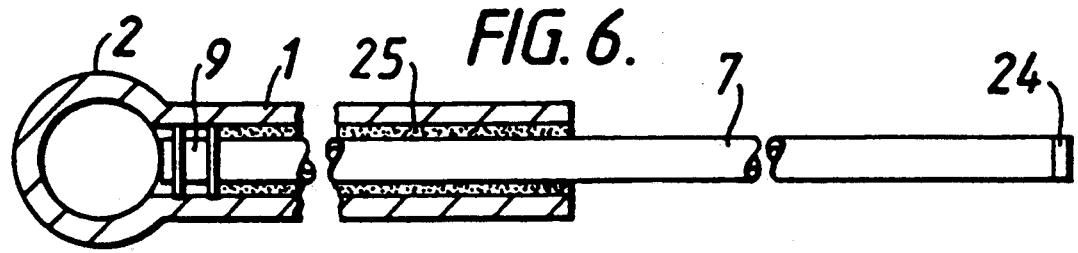
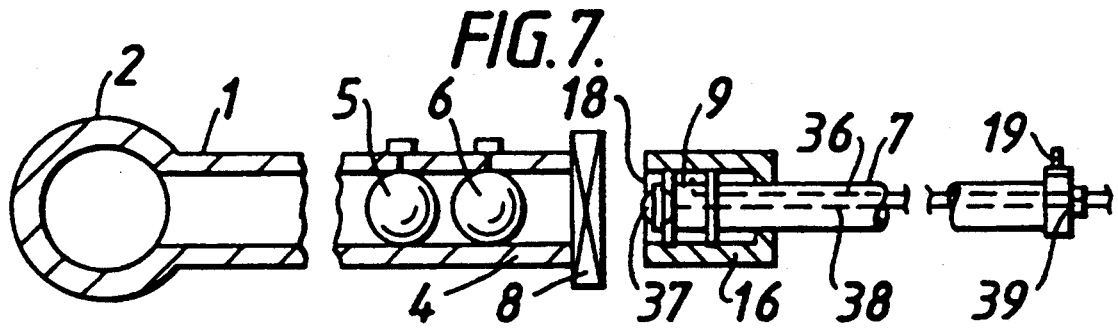
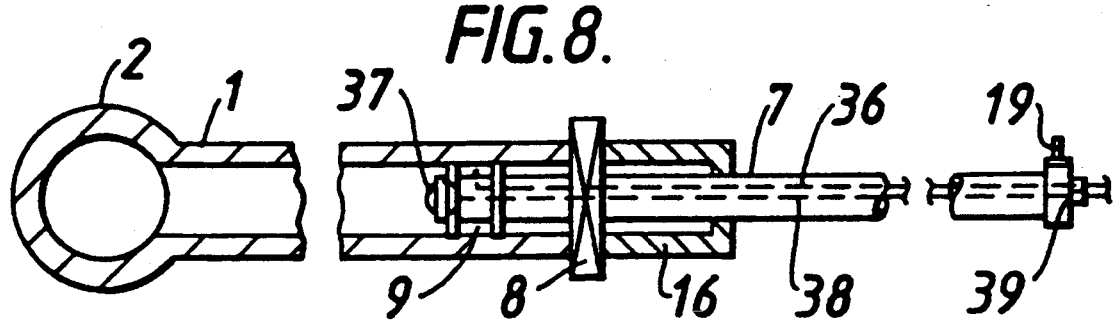
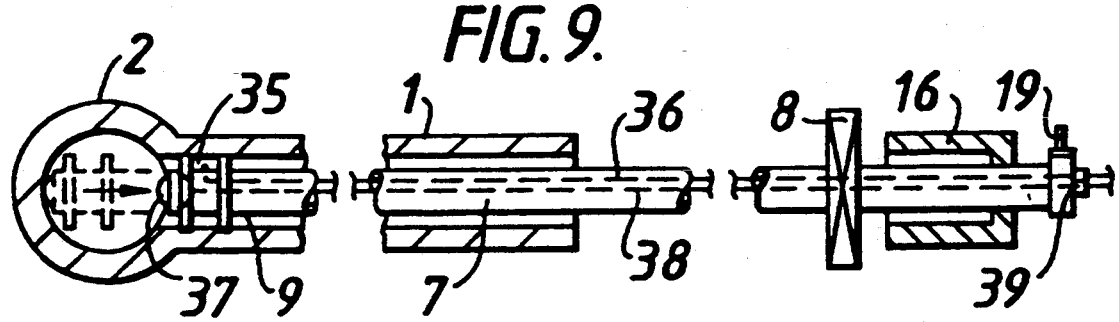
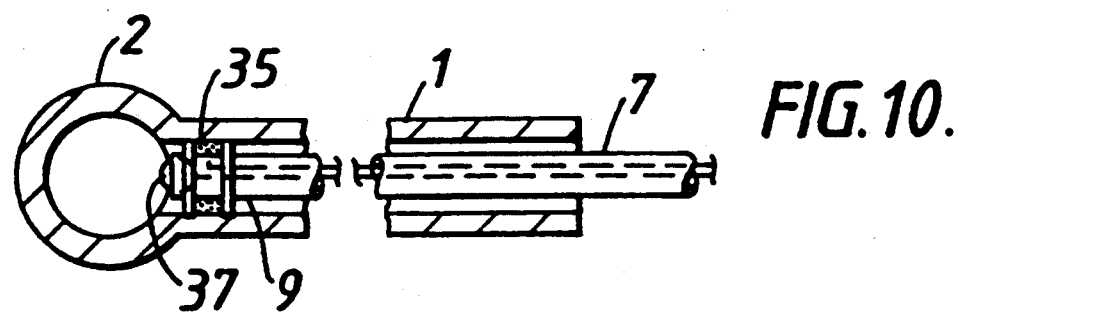

METHOD OF REPLACING BRANCH MAINS

This is a division, of application Ser. No. 07/786,784, filed on Nov. 1, 1991, now abandoned.

The present invention relates to replacing an existing main with a replacement main.

Gas, water and sewage mains may need to be replaced when they develop leaks or for other reasons. Leaks may develop at joints as a result of leak paths appearing within the joints in the case of cast iron gas mains or as a result of cracks in the wall due to corrosion or mechanical damage in cast iron and other materials e.g. ductile iron and steel, cement, brickwork or plastics.

In the case where the main to be replaced is a branch main joined to a fluid-carrying spine main, present techniques of mains replacement necessitate an excavation being made at the junction between the branch main and the spine main to gain access thereto. This is frequently in the middle of a busy thoroughfare and the excavation may lead to disruption of both pedestrians and traffic.

It is an object of the present invention to provide a method by which an existing main can be replaced by a replacement main in such a way that such disruption can be minimised.

According to an aspect of the present invention we provide a method for replacing a branch main lying between and adjoining two fluid carrying spine mains with a replacement main having an outer wall with a smaller diameter than the diameter of the inner wall of the branch main, the method comprising gaining access to the bore of the branch main at a point lying between the spine mains so that a first length of branch main is formed between a first spine main and the access point and a second length of branch main is formed between a second spine main and the access point, feeding one end of a first length of replacement main into the first length of branch main by way of the access point until the first length of branch main has been replaced, feeding one end of a second length of replacement main into the second length of branch main by way of the access point until the second length of branch main has been replaced and then joining the other ends of the lengths of replacement main together.

Figure 11:
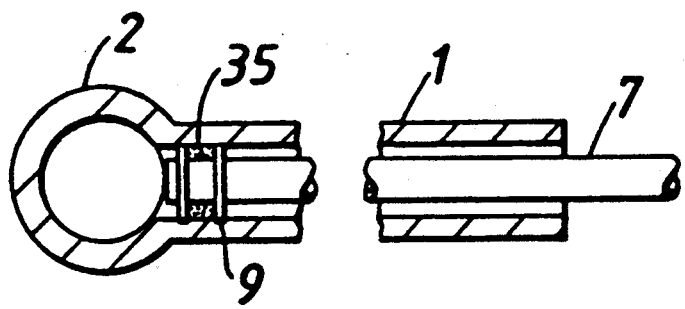
Figure 12:
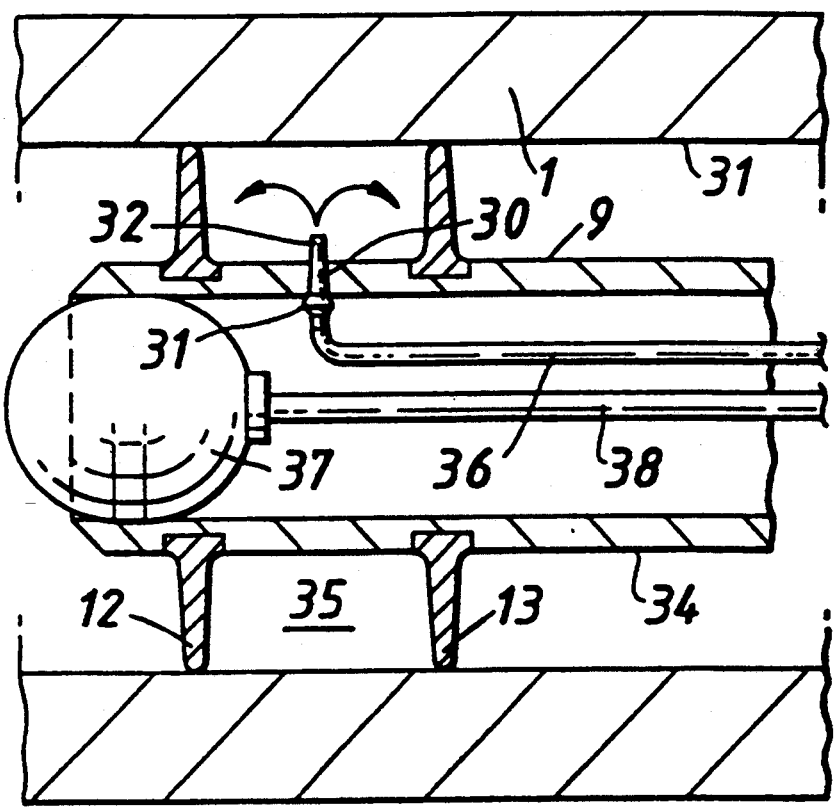
Figure 13:
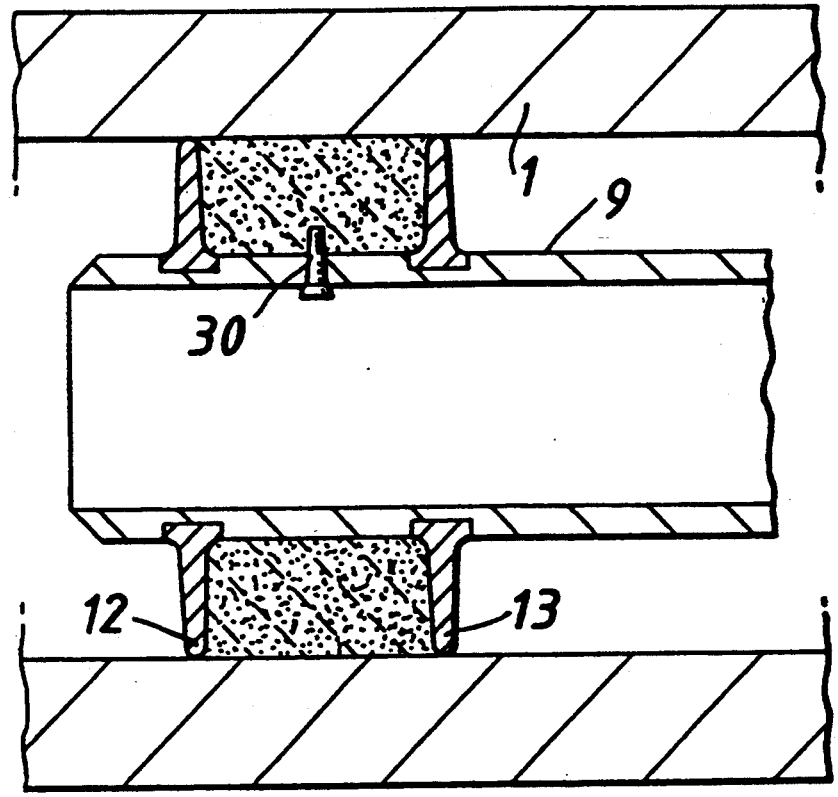

Embodiments of the invention will now be described by way of example only with reference to the accompanying drawings, in which:

FIG. 1 shows a length of a sub-ground branch main joined to a sub-ground spine feeder main carrying fluid, in this case gas, FIGS. 2 to 6 show the steps in a first embodiment of a method for the replacement of the branch main with a length of replacement main, FIGS. 7 to 11 show the steps in a second embodiment of a method for the replacement of the branch main, FIG. 12 is an amplified longitudinally sectioned view of FIG. 9, FIG. 13 is an amplified longitudinally sectioned view of FIG. 11, and FIGS. 14 to 16 show the final three steps of a method for replacing a branch main lying between two spine feeder mains which are adjoined by the branch main.

Figure 14:
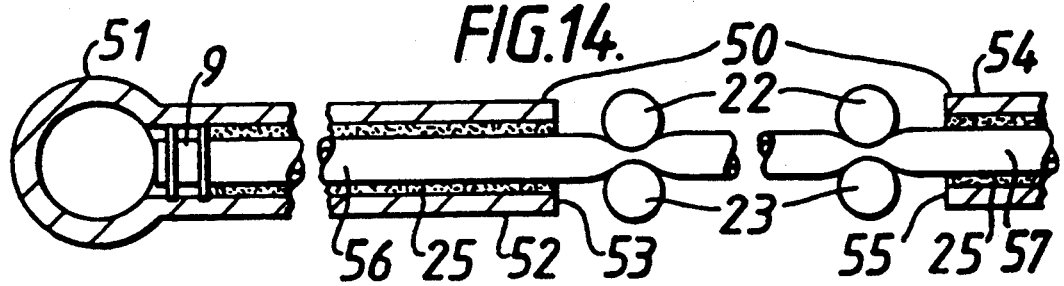
Figure 15:
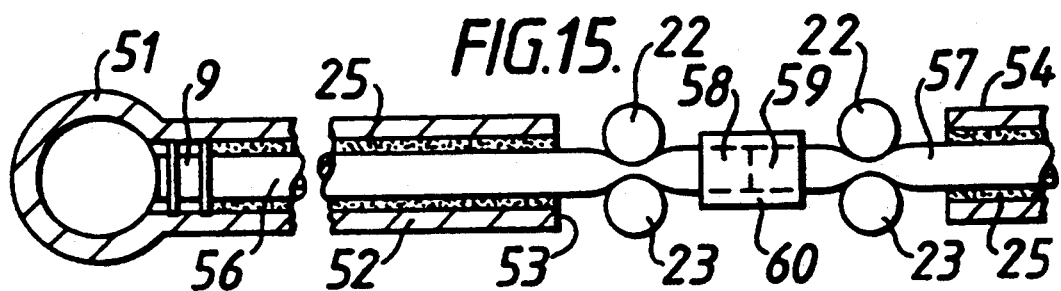
Figure 16:
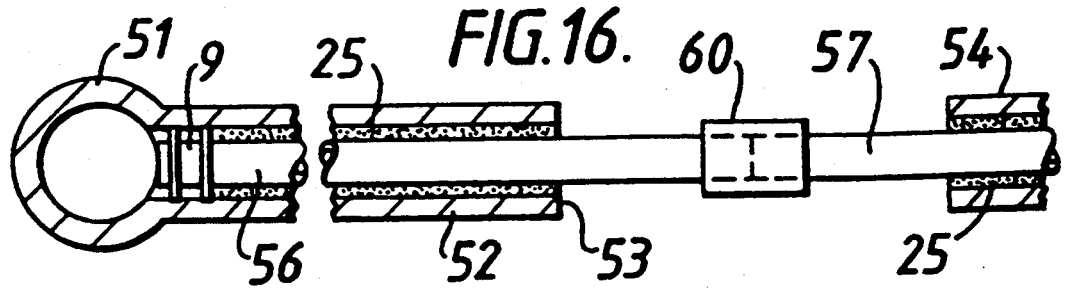

Referring to the drawings, FIG. 1 shows a length of branch main 1 joined to a spine main of the same or larger diameter 2 both of which mains are located underneath the ground. The spine main 1 may be carrying gas, water or sewage although the invention is particularly suitable for the replacement of gas-carrying mains. In FIG. 1 the spine main 2 is a district feeder main, the branch main 1 leading off therefrom and terminating in a closed end 3. In FIGS. 14 to 16 however, the branch main 1 is also fed from a further spine main (not shown) at the other end of the branch main 1. The steps shown in FIGS. 2 to 11 and described in relationship thereto apply to the branch main 1 shown in FIG. 1.

In the first step of each embodiment of the method (FIG. 1) the spine-main distal end 3 of the branch main 1 is exposed by excavation, this end being remote from the spine main 2. Alternatively, an excavation can be made between the spine main and distal end 3 to any convenient point, as required.

In the first version of the method (FIG. 2) a part 4 of the branch main I is exposed at a convenient point which in this case is close to the end 3 and is sealed off from the flow of gas by the known technique of "bagging off". Here a pair of removable inflatable rubber bags 5, 6 respectively are inserted into the main 1 at spaced apart positions and are inflated as shown temporarily to block the bore of the main 1.

In the next step of this method (FIG. 3) the end 3 of the main 1 is removed by sawing or other well known technique to provide an access point for the replacement main 7 to the bore of the branch main 1. A full bore known-type gate valve or damper plate 8 is then connected as shown to the now open end of the branch main 1 and with the valve 8 closed the bags 5 and 6 are deflated and removed through their insertion holes which are plugged or sealed as conventional. A length of replacement main 7 of length sufficient to line or replace the entire length of the branch main 1 from its junction with the spine main 2 to its end 3 is selected, the main 7 being of a suitable synthetic material, preferably polyethylene. The main 7 may comprise discrete lengths fused together or a coil of such material. The outer diameter of the main 7 is smaller than the inner diameter of the branch main 2 to permit the replacement main 7 to be inserted into and fed along the branch main 1.

Figure 3:
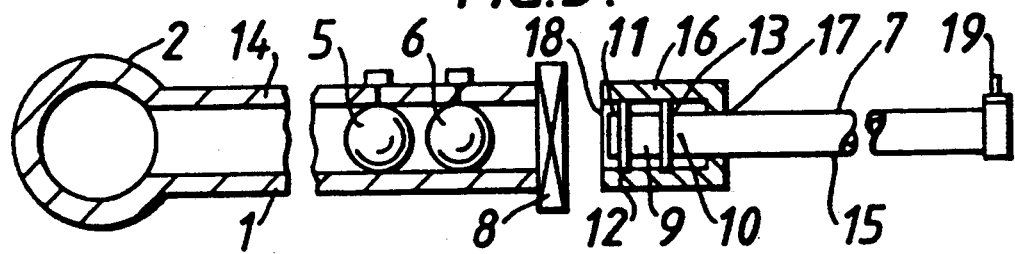

As shown in FIG. 3 the replacement main 7 terminates at its leading end in a head 9 which in effect forms an integral part of the main 7. The head 9 may also be of a suitable synthetic resin material e.g. polyethylene in the form of a moulding and comprises a tubular body with a through-going bore, a rear portion 10 for connection to the end of the replacement main and a front portion 11 having at least one and here two annular vanes 12 and 13 spaced apart along and disposed around the outer wall of the head 9. While a head having two vanes is described there may be more than two if desired or necessary. In use of the head 9, the vanes 12 and 13 form a close or tight fit with the inner wall 14 of the branch main 1 so as to provide a gas-tight barrier to the flow of gas along any clearance between the inner wall 14 of the branch main 1 and the outer wall 15 of the replacement main 7 when the latter is inserted into and pushed along the branch main 1. The external diameter of the vanes may be equal to or greater than the internal diameter of the existing main to achieve the close or tight fit. The head 9 may be attached to the replacement main 7 in any convenient fashion for example by fusion, adhesive or as a force fit within the end of the main 7. Before however the head 9 is attached to the leading end of the main 7, this end is inserted through a known-type gland box or pig trap 16 (FIG. 3). The gland box 16 has an entry wall 17 formed of elastomeric components which form a hole through which the end of the replacement main 7 may be inserted, the edge forming the hole providing a flexible seal for the outer wall 15 of the main 7. Once the leading end of the main 7 has been inserted into the gland-box 16 and pushed clear of its mouth 18, the head 9 can be attached to the leading end of the main 7. After this step the head 9 is pulled back into the gland-box 16 as shown in FIG. 3. The other end of the replacement main 7 is closed by a known type cap with fitted purge valve 19 (FIG. 3) to provide means by which any air within the main 7 can be removed by purging as will be described subsequently.

Figure 4:
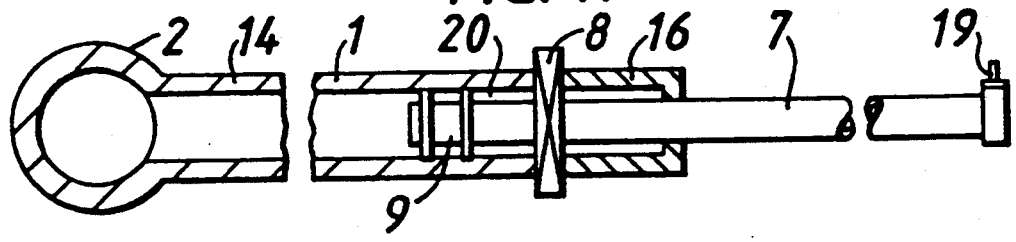

Referring to FIG. 4, in the next stage of the method the gland-box 16 is connected to the valve 8, the valve 8 is opened and the main 7 is pushed from the gland-box 16 into the branch main 1. Gas entering the branch main 1 from the spine main 2 is forced to enter the replacement main 7 because the vanes 12 and 13 prevent its entering any clearance 20 between the outer wall 15 of the replacement main 7 and the inner wall 14 of the branch main 1. Pushing of the main 7 towards the spine main 2 can be effected by hand or mechanically by means of a conventional pipe pusher machine.

Figure 5:
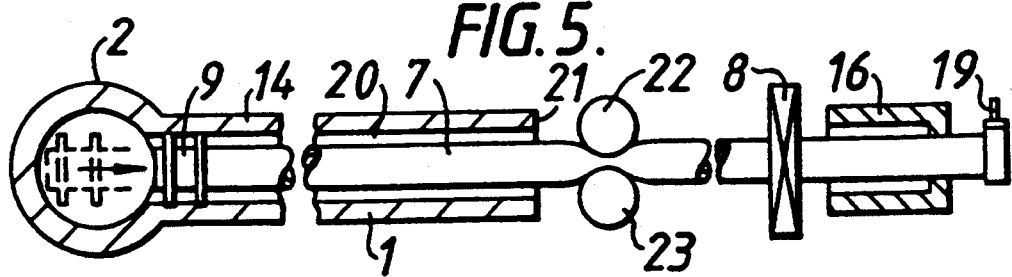

The replacement main 7 is pushed along the branch main i until the head 9 reaches and enters the spine main 2 (FIG. 5). The main 7 is then retracted a short distance until the head 9 is securely located in the branch main 1. This point can be determined by monitoring the pressure in the clearance 20 which will be positive when the head 8 is inside the spine main 2 but will drop to zero when the head 8 is once again inside the branch main 1. Alternatively or in addition the head could incorporate a TV camera or probes to detect the spine main 2.

The head 9 could be retracted still further if it is desired to replace a shorter section of branch main 1. The purge valve 19 is opened to permit gas to purge any air from the main 7 and then the valve 19 is closed.

The gland-box 16 is then disconnected from the valve 8 and is slid along the main 7 towards the purge valve 19. Next, the valve 8 is disconnected from the end 21 of the branch main I and this too is slid along the main 7 towards the valve 19. Alternatively, both valve and gland box can remain joined and be slid along the main still connected and then be disconnected from each other.

A so called "squeeze off" is then applied to the main 7 between the end 21 of the branch main 1 and the valve 8 by means of a pair of known type squeeze rolls 22 and 23 which squeeze the main 7 flat to prevent gas reaching the valve 19. With the squeeze off still applied the purge valve 19 is removed.

Referring to FIG. 6 the gland box 16 and valve 8 are then slid off the end 24 of the main 7 with the squeeze off still applied and then the end of the replacement main 7 is closed by means of a cap 24 which may be of a synthetic resin material e.g. polyethylene and which is fused or adhered to the main 7 in any suitable manner. The squeeze off is then removed. Finally a conventional sealant injection device (not shown) is fitted to the end 21 of the branch main 1 and the clearance 20 between the branch main 1 and the replacement main 7 up to the head 9 is filled with a suitable sealant 25 such as a cementitious grout, cement, epoxy or anaerobic sealant to provide a secondary gas-tight permanent seal in addition to that formed by the vanes. An end cap seal device may be necessary to achieve a temporary seal between the outside of the main 7 and the branch main 1 to allow the sealant to fully fill the gap.

Figure 2:
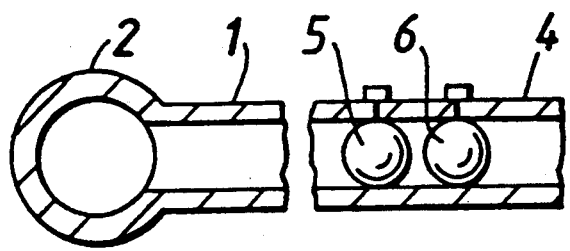

In the method described with reference to FIGS. 2 to. 6, a fairly large quantity of sealant is required to fill the clearance 20 between the branch main 1 and the replacement main 7 up to the head 9. While in general it is desirable to fill this clearance, it is not absolutely essential as long as an effective seal is formed somewhere in the clearance.

This is achieved by the method shown in FIGS. 7 to 11 and involves the use of the modified head shown in detail in FIGS. 12 and 13. Unless otherwise indicated, the components in FIGS. 7 to 13 are identical to those shown in FIGS. 1 to 6 and therefore bear identical reference numerals.

Referring to FIGS. 12 and 13, the head 9 is identical to that described in FIGS. 3 to 6 except that extending through an aperture in the wall of the head 9 located between the vanes 12 and 13 is an injection nozzle 30 which is force fitted or glued to the head 9. The inlet end 31 of the nozzle 30 terminates inside the bore of the head 9, while the outlet end 32 of the nozzle 30 terminates between the vanes 12 and 13.

In use, with the head 9 positioned as shown within the branch main 1, there is formed between the inner wall 33 of the branch main 1, the vanes 12 and 13 and the outer wall 34 of the head 9 lying between the vanes 12 and 13, an annular chamber 35 in which the sealant may be injected via the nozzle 30 as shown in FIG. 13. In this way a seal may be formed with a relatively small amount of sealant.

In use, the sealant is supplied to the nozzle 30 by means of a flexible e.g. polyethylene hose 36 which as shown in FIG. 12 is connected to the inlet end 31 of the nozzle 30. The hose 36 extends rearwardly through the head 9 and through and out of the far end of the replacement main as will be described in more detail subsequently. The hose 36 is connected to a pump (not shown) which pumps sealant along the hose 36 to the nozzle 30 where it is discharged into the annular chamber 35. When this chamber 35 is full as indicated by an increase in pumping pressure, the hose 36 may be removed from the nozzle 30 and then removed from the replacement main. To this end the hose 36 is connected to the nozzle 30 by a breakable-type connection whereby the hose 36 may simply be snapped off from the nozzle 30 after the clearance has been filled with sealant.

As shown in FIG. 12, to prevent in use ingress of dirt and other debris into the head 9 during insertion into the branch main 1, the bore of the head 9 may be temporarily blocked by a conventional inflatable rubber bladder 37 which can be positioned near the front end of the head 9 as shown. The bladder 37 is inflated (and deflated) by means of a hose 38 which like the hose 36 extends rearwardly through the head 9 and through and out of the far end of the replacement main as will be described in more detail subsequently.

Referring to FIG. 7, this step of the second method is similar to the stage described in relation to FIG. 3 except that the head 9 is provided with the bladder 37 which has been inflated before the head 9 is inserted into the gate valve 8. The bladder hose 38 extends rearwardly through the head 9, the replacement main 7 and a known type pipe gland 39 to a source of compressed air (not shown). In addition of course the nozzle hose 36 also extends rearwardly through the head 9, the replacement main 7 and the pipe gland 39 to a suitable sealant pump (not shown). The pipe gland 39 forms a seal between the replacement main 7 and the hoses 36 and 38.

In FIG. 8, the main 7 has been pushed into the branch main 1 via the gland box 16 in a manner similar to that previously described in relation to FIG. 4.

Referring to FIG. 9, the step here is similar to that previously described with reference to FIG. 5 except that as the bore of the head 9, and therefore the replacement main 7, is blocked by the inflated bladder 37 there is no need to squeeze off the main 7. At this stage, a sealant of the type previously mentioned is pumped along the hose 36 to emerge into the annular chamber 35 and form a seal therein as shown in FIG. 10.

After the sealant has been allowed to set, the hose 36 is snapped off from the nozzle 30 and removed from the main 7 via the pipe gland 39. Then the bladder 37 is deflated and removed via its hose 38 through the pipe gland 39.

A squeeze off is then applied to the main 7 between the end 21 of the branch main 1 and the purge valve 19 and with the squeeze off still applied the gland box 16, valve 8 and pipe gland 39 are slid off the end 24 of the main 7 and then the end of the replacement main 7 is closed by means of a cap so that the position in FIG. 11 is reached.

The head 9 may be dispensed with if the replacement main 7 itself is fitted with the nozzle 30 and vanes 12 and 13. These could be fitted to the main 7 at the factory where the main is produced and supplied to the user complete with nozzle hose 38 connected to the nozzle 30.

Referring to FIGS. 14 to 16 where parts and components similar to those shown in FIGS. 1 to 13 bear similar reference numerals a branch main 50 lies between two spine mains, only one 51 being shown, the main 50 adjoining the spine mains at either end.

Previously to the stage shown in FIG. 14, a section of the branch main 50 located at a point between the spine mains where traffic and pedestrian disturbance is minimal is removed by sawing or other technique to gain access to the bore of the branch main 50. At either side of the section before its removal bags similar to those shown in FIGS. 2 and 3 are inserted to temporarily block the bore of the main 50 to each spine main. After removal of the section and in consequence thereof a first length 52 of branch main 50 is formed between the first spine main 51 and the open end 53 of the length 52 and a second length 54 of branch main 50 is formed between a second spine main (not shown) and the open end 55 of the length 54 as shown in FIG. 7.

Each of the lengths 52 and 54 of branch main may be replaced by suitable corresponding lengths 56 and 57 of replacement mains of a material similar to that previously described, each of the lengths 56 and 57 having outer diameters smaller than the internal diameter of the branch main 50. Any suitable replacement technique can be used for example the so-called "Blackburn process" described in published European patent application No. 0068657.

Preferably however, at least one of the lengths of branch main is replaced by the technique shown in FIGS. 2 to 5 or FIGS. 7 to 13 previously described.

In FIG. 14 both lengths of branch main have been replaced by the technique described in FIGS. 2 to 5. In the position shown in FIG. 14 the corresponding purge valves, gland-boxes and valves have been removed from the lengths 56 and 57 after a squeeze off has been applied by the respective rolls 22 and 23, the ends of the lengths 56 and 57 lying adjacent to each other and the ends being open.

Next with the squeeze off still applied (FIG. 15) the ends 58 and 59 of the lengths 56 and 57 are connected together by any convenient means such as by butt-fusion or as shown in FIG. 15 by means of a known type electrofusion sleeve 60.

Finally (FIG. 16) the squeeze offs are removed. In this way gas or other fluid can flow between the spine mains by way of the replacement mains.

The technique described in FIGS. 14 to 16 can be used with advantage to replace any branch main which is too long to be replaced by a single length of main, the site for any necessary excavation being selected so as to provide a minimum of disruption to traffic and pedestrians.

We claim:

1. A method for replacing a branch main lying between and adjoining two fluid carrying spine mains with a replacement main having an outer wall with a smaller diameter than the diameter of the inner wall of the branch main, the method comprising gaining access to the bore of the branch main at a point lying between the spine mains so that a first length of branch main is formed between a first spine main and the access point and a second length of branch main is formed between a second spine main and the access point, feeding one end of a first length of replacement main into the first length of branch main by way of the access point until the first length of branch main has been replaced, feeding one end of a second length of replacement main into the second length of branch main by way of said access point until the second length of branch main has been replaced and then joining the other ends of the lengths of replacement main together wherein one end of each said length of replacement main has at least two spaced annular vanes disposed therearound and extended from an outer wall thereof to define a clearance between the replacement main and the branch main when the replacement main has been fed into the branch main, and further comprising a step of injecting a substance capable of forming a seal into said clearances, via an injection point in the wall of the replacement main and located between said vanes.

* * * * *

UNITED STATES PATENT AND TRADEMARK OFFICE
CERTIFICATE OF CORRECTION

PATENT NO. : 5,433,251
DATED : July 18, 1995
INVENTOR(S) : Anthony D. ELGAR, et al.

It is certified that error appears in the above-indentified patent and that said Letters Patent is hereby corrected as shown below:

On the title page, Item [62], the Related U.S. Application Data should read:

--Division of Ser. No. 786,784, Nov. 1, 1991, Pat. No. 5,345,971--

Signed and Sealed this

Fifth Day of September, 1995

Attest:

BRUCE LEHMAN

Attesting Officer

Commissioner of Patents and Trademarks